(12) United States Patent
Vlasak et al.

(10) Patent No.: US 10,633,188 B2
(45) Date of Patent: Apr. 28, 2020

(54) CONVEYING DEVICE CONSISTING OF A PLURALITY OF CONVEYOR-BELT SEGMENTS LINED UP ADJACENT TO EACH OTHER

(71) Applicant: INNOVA PATENT GMBH, Wolfurt (AT)

(72) Inventors: Pavel Vlasak, Sarnthein (IT); Jiri Drencko, Most (CZ)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 16/348,237

(22) PCT Filed: Oct. 24, 2017

(86) PCT No.: PCT/EP2017/077173
§ 371 (c)(1),
(2) Date: May 8, 2019

(87) PCT Pub. No.: WO2018/086875
PCT Pub. Date: May 17, 2018

(65) Prior Publication Data
US 2019/0322455 A1    Oct. 24, 2019

(30) Foreign Application Priority Data

Nov. 8, 2016    (AT) .............. A 51017/2016

(51) Int. Cl.
*B65G 17/06*    (2006.01)
*B66B 23/10*    (2006.01)
*B66B 23/08*    (2006.01)

(52) U.S. Cl.
CPC ............ *B65G 17/066* (2013.01); *B66B 23/08* (2013.01); *B66B 23/10* (2013.01)

(58) Field of Classification Search
CPC .... B65G 17/065; B65G 17/066; B65G 17/06; B65G 17/08; B65G 21/16; B65G 15/02; B66B 23/12; B66B 23/08; B66B 21/10; B66B 21/12
USPC .......................... 198/321, 831, 850, 852, 853
See application file for complete search history.

(56) References Cited

U.S. PATENT DOCUMENTS

| | | | | |
|---|---|---|---|---|
| 3,270,862 A | * | 9/1966 | Goldberg ............ | B65G 17/066 198/841 |
| 3,513,780 A | * | 5/1970 | Jenkins ................... | B66B 23/10 198/844.2 |
| 3,554,360 A | * | 1/1971 | Bildsoe ................ | B65G 17/066 198/833 |

(Continued)

FOREIGN PATENT DOCUMENTS

| DE | 3701772 A1 | 8/1987 |
|---|---|---|
| DE | 69405708 T2 | 1/1998 |

(Continued)

*Primary Examiner* — James R Bidwell
(74) *Attorney, Agent, or Firm* — Laurence A. Greenberg; Werner H. Stemer; Ralph E. Locher

(57) ABSTRACT

A segment or a strip for a segment of a conveying device, having at least one end face, which faces a segment adjoining the segment or faces a strip on an adjoining segment, optionally a rear side and parallel ribs which extend on a top side of the segment or of the strip in the conveying direction. An end region of the ribs is beveled in the region of the end face.

23 Claims, 4 Drawing Sheets

(56) References Cited

U.S. PATENT DOCUMENTS

| | | | |
|---|---|---|---|
| 3,685,637 A * | 8/1972 | Bildsoe | B65G 17/066 198/846 |
| 3,826,150 A | 7/1974 | Palmaer | |
| 4,754,872 A | 7/1988 | Damkjaer | |
| 5,042,648 A * | 8/1991 | Garvey | B65G 17/066 198/321 |
| 5,370,217 A | 12/1994 | Foster | |
| 6,471,049 B1 * | 10/2002 | van Esch | B65G 17/08 198/853 |
| 6,978,876 B1 | 12/2005 | Tsukahara et al. | |
| 7,441,646 B2 | 10/2008 | Heit et al. | |
| 7,588,140 B2 * | 9/2009 | van den Goor | B65G 17/066 198/831 |
| 7,931,139 B2 | 4/2011 | Nielsen | |
| 9,352,937 B2 * | 5/2016 | Nakagaki | B66B 23/12 |
| 2007/0036626 A1 | 2/2007 | Aulanko et al. | |
| 2013/0277182 A1 * | 10/2013 | Studer | B65G 17/066 198/850 |

FOREIGN PATENT DOCUMENTS

| | | |
|---|---|---|
| DE | 202007003324 U1 | 5/2007 |
| EP | 2918538 A1 | 9/2015 |
| FR | 1403181 A | 6/1965 |
| GB | 1360055 A | 7/1974 |
| JP | 2014073889 A | 4/2014 |
| WO | 2005108248 A1 | 11/2005 |

* cited by examiner

CONVEYING DEVICE CONSISTING OF A PLURALITY OF CONVEYOR-BELT SEGMENTS LINED UP ADJACENT TO EACH OTHER

BACKGROUND OF THE INVENTION

Field of the Invention

The invention relates to a segment of a conveying installation, having at least one end side which faces a segment that adjoins the segment, and having mutually parallel ribs which in the conveying direction run on an upper side of the segment.

The invention furthermore relates to a strip for a segment of a conveying installation, having an end side which faces the segment that adjoins the segment, having a rear side and mutually parallel ribs which in the conveying direction run on the upper side of the strip.

The invention moreover relates to a segment for a conveying installation which has at least one such strip, and to a conveying installation which has at least one segment according to the invention.

For reasons of technical safety, conveying installations for transporting people or goods such as, for example, conveying belts consisting of a plurality of segments lined up adjacent to one another, often have a structured surface having mutually parallel ribs on the surface.

However, the rib structure in the case of conveying belts which consist of a plurality of segments arranged behind one another and in which the segments not only run so as to be rectilinear but also along curves having radii of dissimilar sizes harbors a certain risk. Since two segments that are mutually contiguous along the curved end sides pivot in relation to one another when passing a curve, the ribs in the region of the end sides are mutually displaced in a transverse manner. On account of the front lateral edges of the ribs moving transversely in relation to one another during pivoting, considerable shear forces act on an object such as a rock or a finger which is lodged between two neighboring ribs and herein bridges the gap between the segments. In the case of a jammed object, this can lead to damage to the conveying installation and in the case of jammed body parts to severe injuries.

SUMMARY OF THE INVENTION

The invention is therefore based on the object of making available a segment, a strip, or a conveying installation, of the generic type mentioned at the outset, by way of which the issues indicated can be avoided as far as possible.

This object is achieved according to the invention by a segment, a strip, a segment having at least one strip, and a conveying installation, as claimed.

Preferred and advantageous embodiments of the invention are the subject matter of the dependent claims.

It is provided according to the invention that the ribs in an end region of the end side are beveled.

On account of the end regions of the ribs that are beveled according to the invention, the forces which act on objects that are jammed between neighboring ribs have an upwardly directed component, on account of which the objects are squeezed or pushed upward, respectively, out of the region between the ribs, without any damage arising on the conveying installation, or injuries to people or animals being able to occur.

It is provided in the context of the invention that ribs of lateral faces that face neighboring ribs in lateral planes have an upwardly directed cover face in an upper plane, and at least two lateral oblique faces which are disposed in the end region. The oblique faces herein are preferably in each case inclined away from one lateral plane in the direction of the other lateral plane of the same rib and/or away from the end side in the direction of the rib.

It is particularly preferable for ribs to have an end face which is disposed in the region of the end side and is substantially orthogonal to the cover face and to the lateral faces.

In one embodiment according to the invention ribs in the end region have an upper oblique face which is inclined away from the upper plane downward and away from the end side, wherein the upper oblique face is contiguous to the cover face.

In one further embodiment according to the invention the ribs in the end region have a front oblique face which is inclined away from the end side and inclined from the upper plane downward, wherein the front oblique face is contiguous to the end side, optionally to the end face.

It is likewise conceivable in the context of the invention that ribs in the end region have two, or more than two, mutually contiguous lateral oblique faces, and/or further oblique faces which are contiguous to the upper oblique face, and/or further front oblique faces which are contiguous to the front oblique face.

A stepped transition from the end side toward the rib can thus be advantageously achieved.

In one embodiment of the invention, oblique faces can also be curved, wherein a curved oblique face in the context of the invention can be considered to be a multiplicity of more or less small or narrow, respectively, flat oblique faces which are disposed beside one another and are slightly mutually inclined.

Edges and corners of the ribs, in particular in the end region, can be radiused and/or chamfered or beveled, respectively, and edges of the ribs can run so as to be rectilinear and/or curved. This serves for avoiding sharp edges and corners, this further minimizing the risk of injury or damage.

When a virtual sectional plane that runs so as to be orthogonal to a direction of longitudinal extent of the rib and through at least two lateral oblique faces intersects each of the lateral oblique faces along a sectional straight, intersects each of the lateral planes along a lateral straight, and intersects the upper plane along an upper straight, and the upper straight and the sectional straight herein enclose an upper inclination angle, and the lateral straight and the sectional straight enclose a lower inclination angle, each of the inclination angles in one particularly preferred embodiment of the invention is thus larger than 90° and smaller than 180°.

It is particularly advantageous for each inclination angle to be between 105° and 165°, more advantageously between 120° and 150°. Since the sum of the two inclination angles is always 270°, the inclination angles are thus embodied so as to be as obtuse as possible. On account thereof, the oblique face has an inclination by way of which an object lying between the ribs can be particularly advantageously deflected upward, without excessive shear forces acting on said object.

In one preferred embodiment, a segment of a conveying installation, having at least one end side which faces a segment that adjoins the segment, and having mutually parallel ribs which in the conveying direction run on an upper side of the segment, has at least one strip according to the invention, wherein the strip is disposed, preferably so as to be releasable, for example screw-fitted, in the region of at least one end side of the segment.

It is particularly favorable for the strip to run along the upper edge of the end side, or to replace said upper edge, respectively.

In the case of a releasably assembled strip, said strip can be easily exchanged when the latter is damaged or worn, or be replaced with a strip with ribs that are beveled in a dissimilar manner, when required. The strip of such a segment can furthermore be made from another material than the segment, for example from a more cost-effective material and/or a material that has other properties, in particular a softer or harder material.

In one particularly preferred embodiment, the strip is incorporated in the segment in such a manner that the surface of the strip, conjointly with the surface of the segment, forms a plane and the ribs of the strip are precisely lined up with the ribs of the segment.

The end side of the strip preferably terminates so as to be planar with the end side of the segment. However, in one alternative embodiment, the strip can also protrude beyond the end side. On account thereof, a wider gap below the strips is formed between the segments, and small loose objects can drop below the conveying installation, or fall downward from the conveying installation, respectively, when said objects are caught between the strip.

It is particularly preferable for strips to be disposed on both end sides of the segment, as has already been described.

BRIEF DESCRIPTION OF THE SEVERAL VIEWS OF THE DRAWING

Further details, features, and advantages of the invention are derived from the description hereunder with reference to the appended drawings in which preferred embodiments which do not limit the scope of protection are illustrated. In the drawings.

DESCRIPTION OF THE INVENTION

Figure 1:
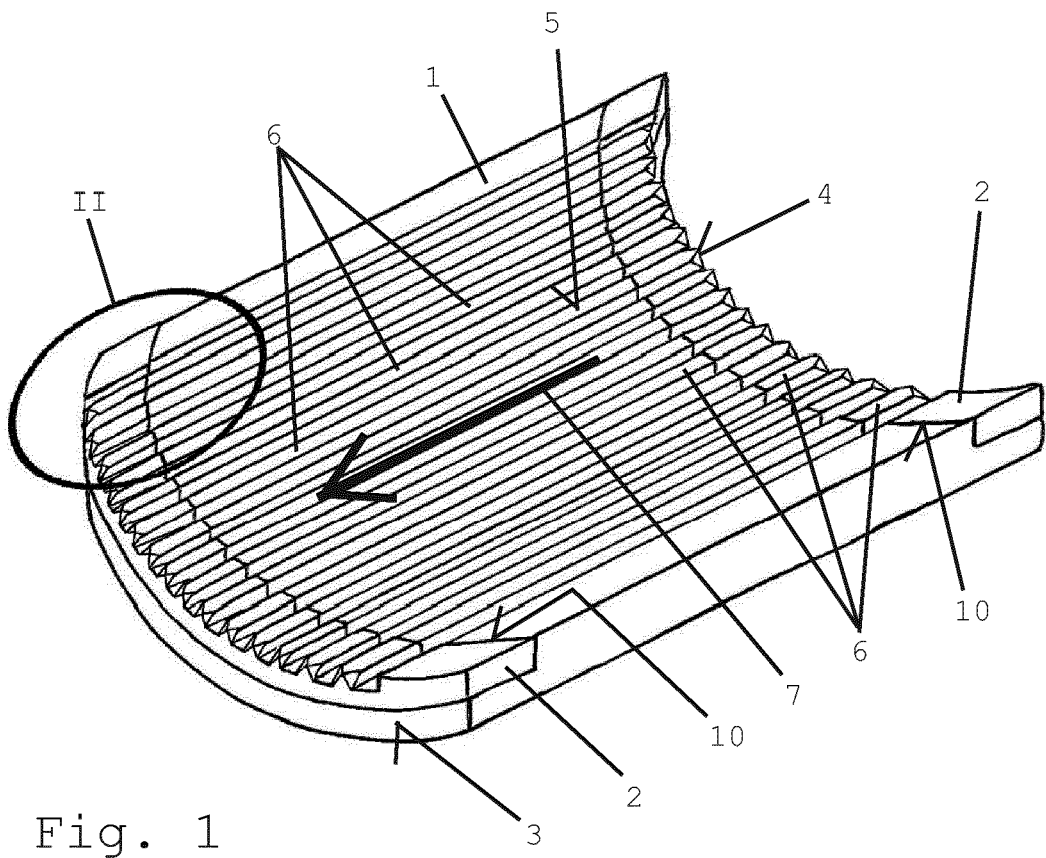
FIG. 1 shows an isometric view of a segment according to the invention, having strips.

FIG. 1 shows the schematic illustration of a segment 1 according to the invention, having strips 2 according to the invention, said strips 2 being disposed along a front end side 3 and a rear end side 4 of the segment. Ribs 6 which in the conveying direction 7 run so as to be mutually parallel are disposed on an upper side 5 of the segment 1 and the strips 2. In operation, the end sides 3, 4 face the neighboring segments, or the end sides of the neighboring segments, respectively (neighboring segments not illustrated).

The strip 2 which, when viewed in the conveying direction 7, is disposed on the front has a convexly curved end side 3 which is directed away from the segment 1, and a concavely curved rear side 10 which is directed toward the segment 1. The strip 2 which, when viewed in the conveying direction 7, is disposed on the rear has a concavely curved end side 4 which is directed away from the segment 1, and a convexly curved rear side 10 which is directed toward the segment 1. The end sides 3, 4 of the strips terminate so as to be planar with the end sides 3, 4 of the segment.

The ribs 6 of the strips 2 in terms of shape, alignment, and position, preferably match exactly the ribs 6 of the segment 1 such that each rib 6 runs so as to be substantially continuous and without a step or shoulder from the front end side 3 to the rear end side 4.

A conveying installation which has a conveyor belt and which substantially consists of a line-up of successive segments 1, wherein the segments 1 are connected to one another and can pass curves having radii of dissimilar sizes is described and illustrated in WO 2012/097390 A1, for example. According to the invention, these segments are embodied as described in the present application.

The segments 1 of the conveying installation can be connected to one another as described in Austrian patent application A 720/2015, for example, and the conveying installation, or the segments 1 of the conveying installation, respectively, can be driven as described in Austrian patent application A 396/2015, for example.

Figure 2:
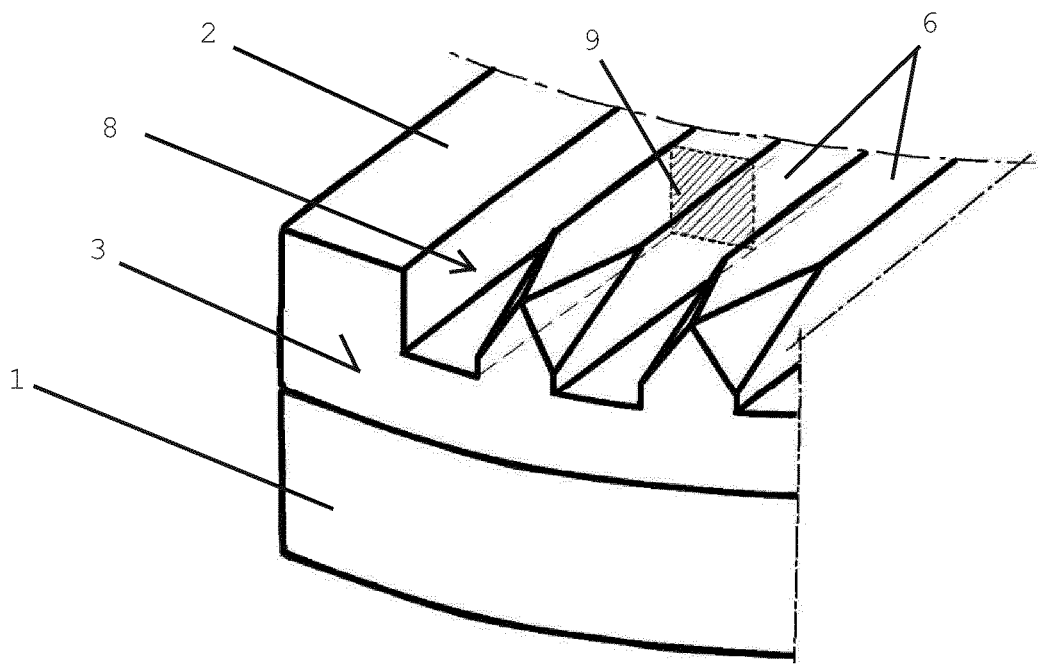
FIG. 2 shows an isometric view of a detail II of the segment having the strip.

FIG. 2 shows a detail of the front end side 3 from FIG. 1, having an end region 8 of the ribs 6 in the region of the front end side 3. The ribs 6, in a manner adjoining the end region 8, preferably but not mandatorily have a rectangular cross section 9.

FIGS. 3 to 6 show in detail dissimilar embodiments of the end region 8 of a rib 6, wherein all ribs 6 are preferably but not mandatorily embodied in an identical manner.

The illustrated rib 6 of the segment 1 according to the invention, or of the strip 2 according to the invention, has an upwardly directed cover face 11 on which people or goods to be transported can stand or lie, respectively, two lateral faces 12 that face the neighboring ribs 6, and optionally an end face 13 on the end side 3, 4.

Figure 3:
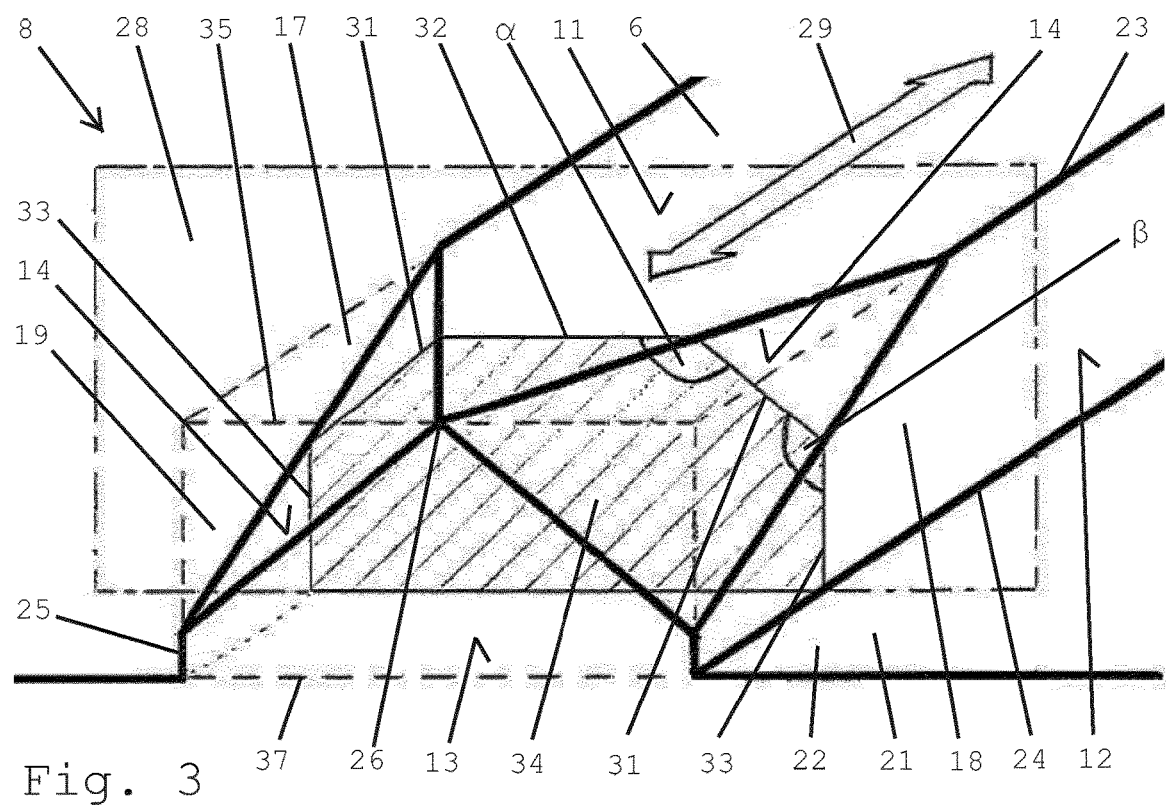
FIG. 3 shows an axonometric view of an embodiment of an end region of a rib.
Figure 4:
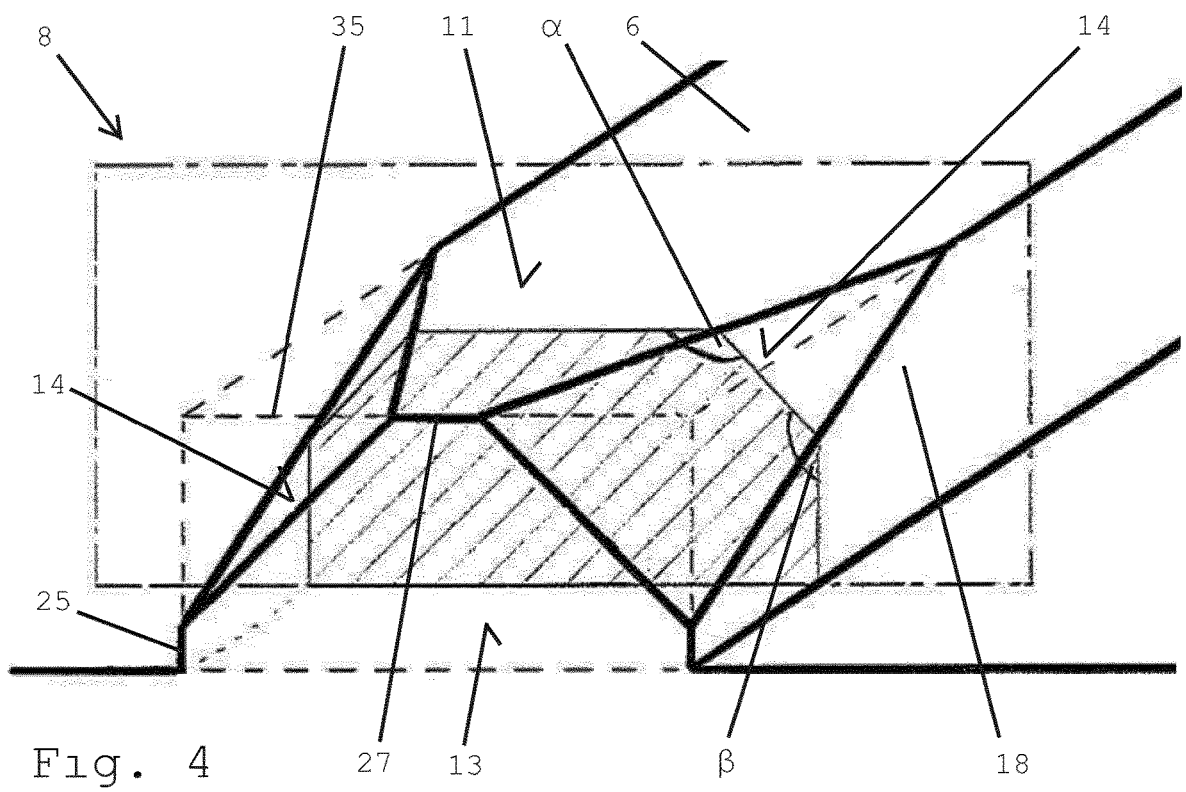
FIG. 4 shows an axonometric view of a further embodiment of the end region of the rib.
Figure 5:
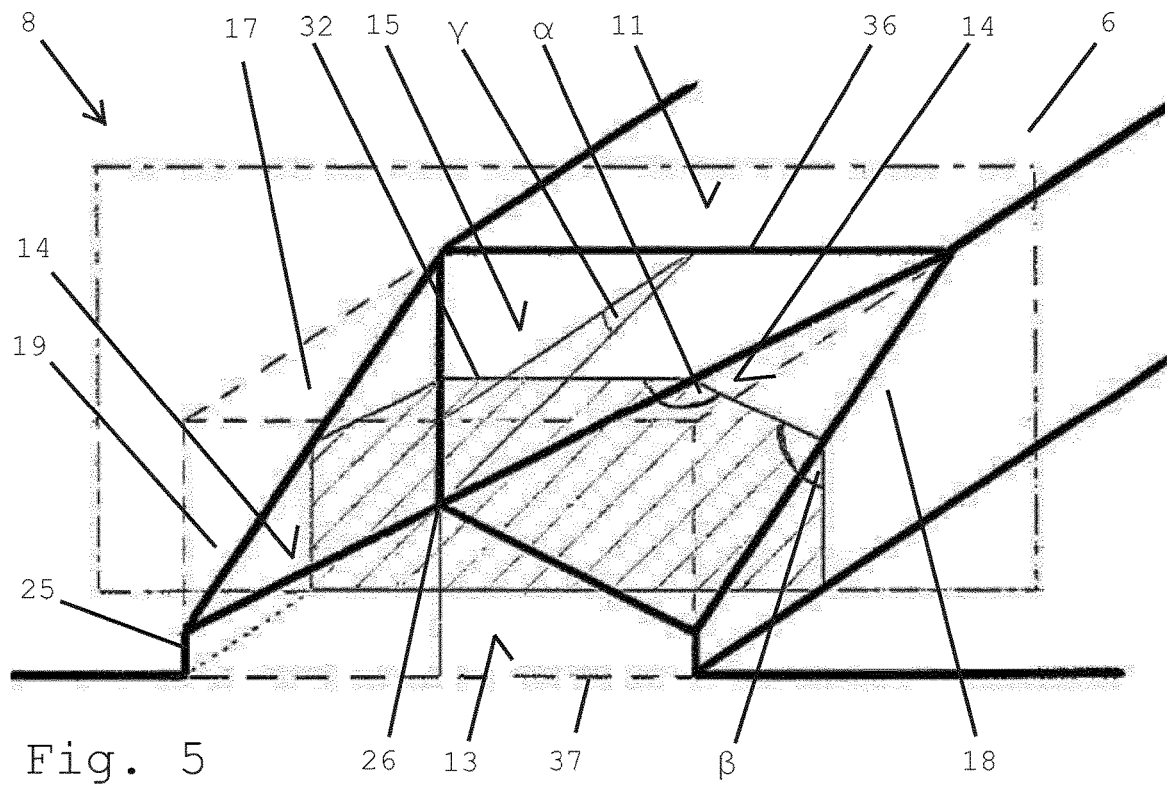
FIG. 5 shows an axonometric view of an embodiment of the end region of the rib, having an upper oblique face.
Figure 6:
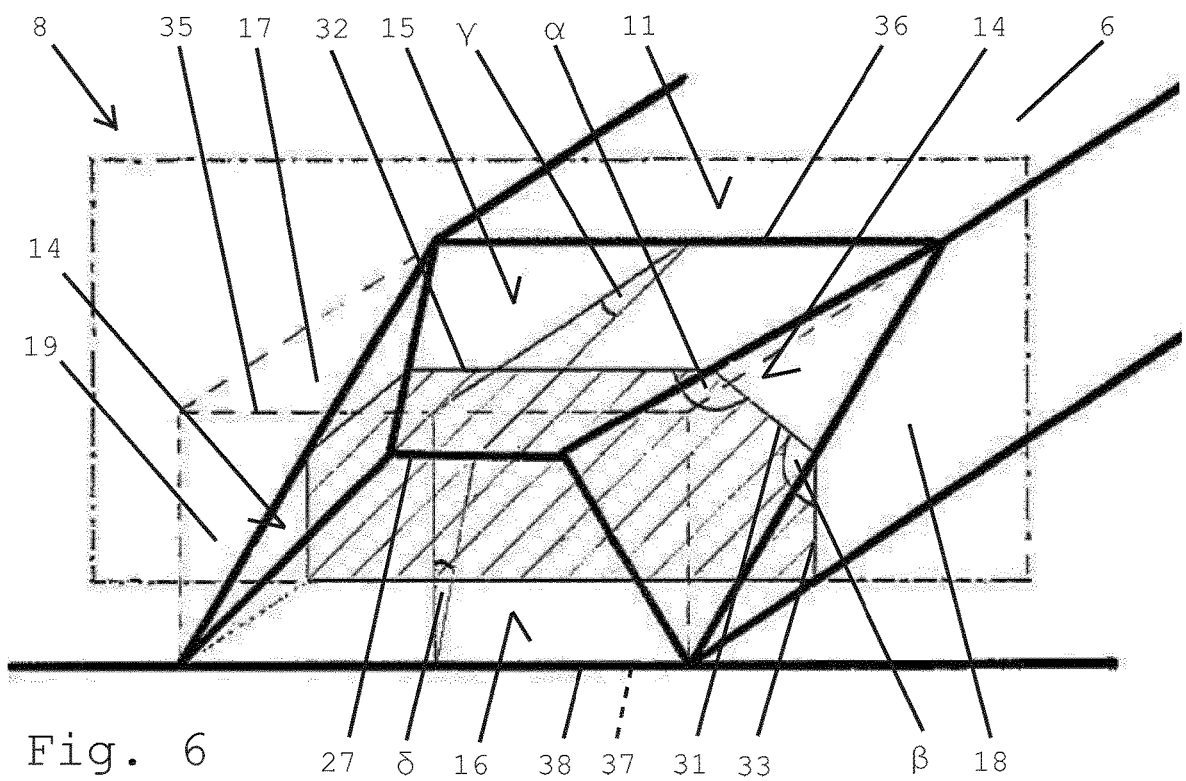
FIG. 6 shows an axonometric view of an embodiment of the end region of the rib, having an upper and a front oblique face.

The rib 6 in the embodiment of FIGS. 3 to 6 furthermore has two lateral oblique faces 14, an upper oblique face 15 in FIGS. 5 and 6, and a front oblique face 16 in FIG. 6.

The cover face 11 is disposed in an upper plane 17, and the lateral faces 12 are disposed in lateral planes 18. An end plane 19 is disposed on the end side 3, 4, said end plane 19 lying so as to be orthogonal to the upper plane 17 and, depending on the curvature of the end sides 3, 4, so as to be substantially orthogonal to the lateral planes 18. When an end face 13 is present, said end face 13 lies in the end plane 19. The rib 6 projects from a base plane 21 upward, wherein base faces 22 are disposed between the ribs 6 in the base plane 21.

A lateral upper edge 23 is formed between the cover face 11 and the respective lateral face 12, and a lateral lower edge 24 is formed between the lateral face 12 and the base face 22. A lateral front edge 25 is furthermore formed between the end face 13 and each of the lateral faces 12 in the embodiments of FIGS. 3 to 5.

The lateral oblique faces 14 contact one another in a contact point 26 by way of in each case one corner, or delimit a contact straight 27 by way of in each case one corner, wherein the contact point 26 or the contact straight 27, respectively, is also contacted by a corner or a lateral edge, respectively, of the cover face 11 (FIGS. 3 and 4) or the upper oblique face 15 (FIGS. 5 and 6), and/or optionally by the end face 13 (FIGS. 3, 4, and 5), and/or by the front oblique face 16 (FIG. 6).

Further modifications, or other combinations, respectively, in terms of the arrangement of the faces mentioned are of course possible in the context of the invention.

A virtual sectional plane 28 lies so as to be orthogonal to the longitudinal extent 29 of the ribs 6, runs through the lateral oblique faces 14, and intersects the latter along in each case one sectional straight 31. The sectional plane 28 furthermore intersects the upper plane 17 or the upper oblique face 15 along an upper straight 32, and intersects the lateral planes 18 along in each case one lateral straight 33.

The rib 6 in the sectional plane 28 has a sectional cross section 34 which for improved visualization is shown in crosshatched manner in FIGS. 3 to 6.

Each of the sectional straights 31 in the virtual sectional plane 28, conjointly with the upper straights 32, encloses an upper inclination angle $\alpha$ and, conjointly with the associated lateral straights 33, encloses a lower inclination angle $\beta$. The inclination angles $\alpha$, $\beta$ are in each case larger than 90° and smaller than 180°.

FIG. 3 shows an embodiment according to the invention of the end region 8 of a rib 6, having an end face 13 and a contact point 26.

The upper plane 17 intersects the end plane 19 along a virtual end straight 35, the contact point 26 being disposed on said virtual end straight 35 so as to be centric between the lateral planes 18. The end face 13 and the cover face 11 taper up to the contact point 26, a corner of the lateral oblique faces 14 also lying in each case in said contact point 26.

In this embodiment, the upper inclination angle $\alpha$ is approx. 140°, and the lower inclination angle $\beta$ is approx. 130°.

FIG. 4 shows another embodiment according to the invention of the end region 8 of a rib 6 having an end face 13 and a contact edge 27.

The end face 13 and the cover face 11 taper up to the contact edge 27 which is disposed on the virtual end straight 35 so as to be centric between the lateral planes 18. The lateral oblique faces 14 abut the ends of the contact edge 27 by way of in each case one corner.

Both the upper inclination angle $\alpha$ as well as the lower inclination angle $\beta$ in this embodiment are approx. 135°.

FIG. 5 shows a further embodiment according to the invention of the end region 8 of a rib 6 having an end face 13, a contact point 26, and an upper oblique face 15.

The cover face 11 terminates at a rear upper edge 36 which lies between the cover face 11 and the upper oblique face 15, wherein the upper oblique face 15 is inclined from the upper plane 17 downward at an upper inclination angle $\gamma$.

The end face 13 and the upper oblique face 15 taper up to the contact point 26, one corner of the lateral oblique faces 14 also lying in each case in said contact point 26. The contact point 26 lies on the end plane 19, or the end face 13, respectively, so as to be centric between the lateral planes 18, and is spaced apart from the upper plane 17.

In this embodiment, the upper inclination angle $\alpha$ is approx. 150°, and the lower inclination angle $\beta$ is approx. 120°.

FIG. 6 shows yet a further embodiment according to the invention of the end region 8 of a rib 6, having an upper oblique face 15, a front oblique face 16, and a contact edge 27 between said faces 15, 16.

The virtual end plane 19 intersects the base plane 21 along a base straight 37, and the rib 6 in the end region 8 up to the end plane 19 becomes ever lower toward a front lower edge 38 which lies on the base straight 37.

The upper oblique face 15 tapers from the rear upper edge 36 up to the contact edge 27 and is inclined from the upper plane 17 downward at an upper oblique angle $\gamma$. The front oblique face 16 tapers from the front lower edge 38 up to the contact edge 27 and is inclined away from the virtual end plane 19 at a lower oblique angle $\delta$.

The contact edge 27 lies so as to be centric between the lateral planes 18, is spaced apart from the upper plane 17 and from the end plane 19, and lies so as to be parallel with the virtual end straight 35.

In this embodiment, the upper inclination angle $\alpha$ is approx. 140°, and the lower inclination angle $\beta$ is approx. 130°.

Figure 7:
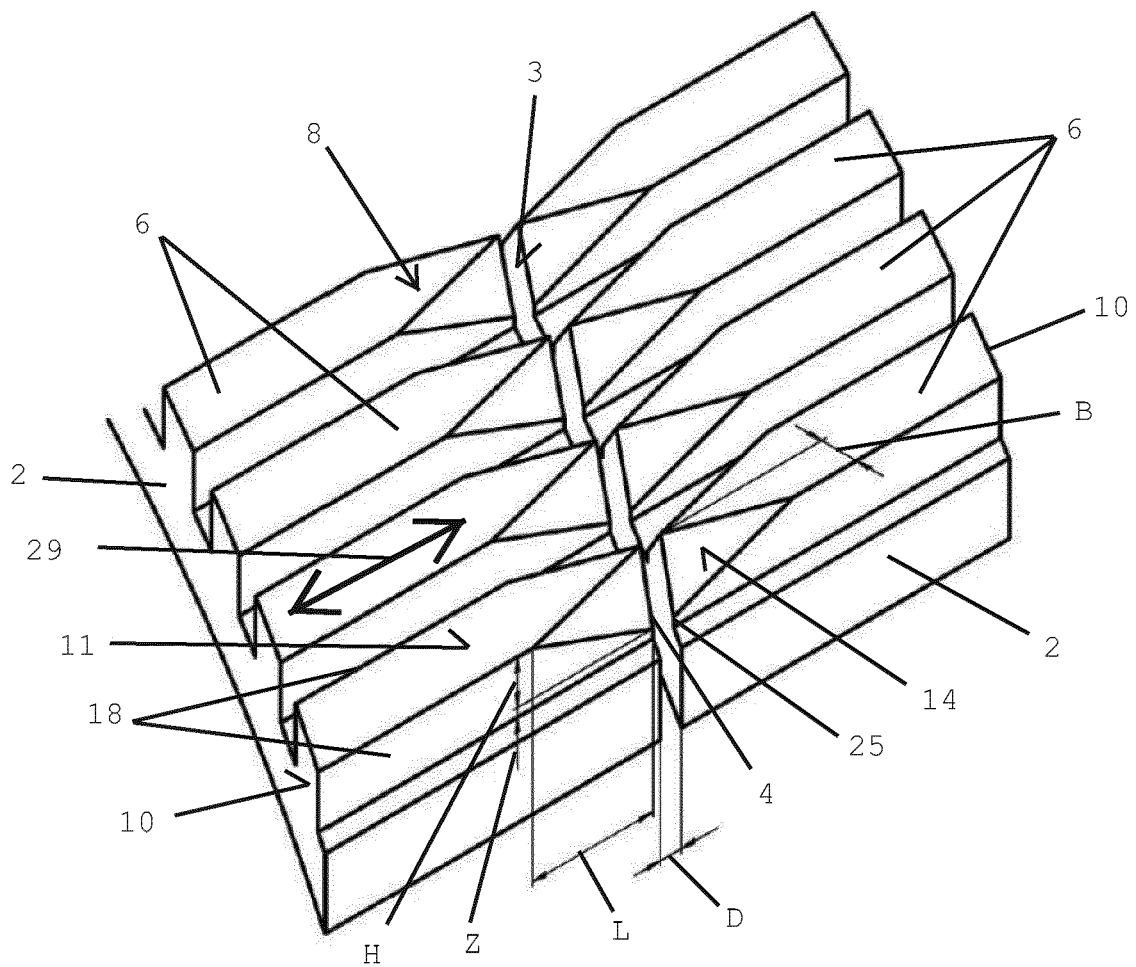
FIG. 7 shows an isometric view of a part-portion of two neighboring strips.

FIG. 7 shows portions of two mutually opposite strips 2 according to the invention of two neighboring segments 1. The illustrated design embodiment of the end region 8 of the ribs 6 corresponds to the particularly preferred embodiment illustrated in detail in FIG. 3.

The front end side 3 of the strip 2 depicted on the left in FIG. 7 is convexly curved, and the rear end side 4 of the strip 2 depicted on the right in FIG. 7 is concavely curved in a manner corresponding to the former.

In one particularly preferred embodiment of the invention, each rib 6 has a half width B of, for example, 4 mm, this corresponding to half the distance between the two lateral planes 18 of a rib 6 and being pre-defined by already existing statutory specifications, for example.

A height Z of the lateral front edges 25 is preferably smaller than 2 mm, and an end height H which corresponds to the rib height minus the height Z is preferably smaller than 1.5 times the half width B, thus preferably smaller than 5 mm, for example.

For production-related reasons, or by virtue of mechanical play in the connection of the neighboring segments, there is gap having a gap width D between the end sides 3, 4 of neighboring strips 2 or segments 1, respectively. The gap width D is preferably as minor as possible, for example 2 mm.

A length L of the end region 8 and thus also of the lateral oblique faces 14 is preferably 2.5 to 5 times the length of the half width B, for example 11 to 16 mm.

Figure 8:
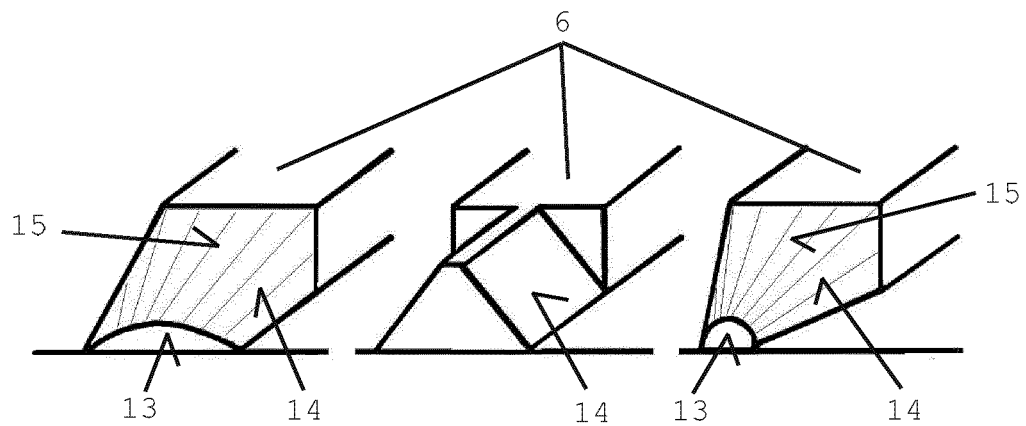
FIG. 8 shows axonometric views of three further embodiments of the end region of the rib.

FIG. 8 shows three further embodiments according to the invention of the end region 8 of a rib 6.

The embodiment illustrated in the center of FIG. 8 has two lateral oblique faces 14 which are inclined away from the respective lateral plane 18 in the direction of the other lateral plane 18 of the same rib 6, but not inclined away from the end side 3, 4 in the direction of the rib 6.

The embodiments illustrated on the right and the left in FIG. 8 have curved oblique faces 14, 15 and end faces 13 in the form of circle segments.

Since the curved oblique faces 14, 15 can also be considered to be a number of lateral and upper oblique faces 14, 15 which are disposed beside one another and embodied so as to be narrow, these embodiments likewise represent a bevel of the end region 8 of a rib 6 in the context of the invention.

LIST OF REFERENCE SIGNS

1 Segment
2 Strip
3 Front end side
4 Rear end side
5 Upper side 6 Rib
7 Conveying direction
8 End region
9 Cross section
10 Rear side
11 Cover face
12 Lateral face
13 End face
14 Lateral oblique face
15 Upper oblique face
16 Front oblique face
17 Upper plane
18 Lateral plane
19 End plane
20 - - -
21 Base plane
22 Base face
23 Lateral upper edge
24 Lateral lower edge
25 Lateral front edge
26 Contact point
27 Contact edge
28 Sectional plane
29 Longitudinal extent
30 - - -
31 Sectional straight
32 Upper straight
33 Lateral straight
34 Sectional cross section
35 End straight
36 Rear upper edge
37 Base straight
38 Front lower edge
α Upper inclination angle
β Lower inclination angle
γ Upper oblique angle
δ Lower oblique angle
B Half width
Z Height
H End height
D Gap width
L Length

The invention claimed is:

1. A segment of a conveying installation, the segment comprising:
   at least one end side facing towards a further segment of the conveying installation;
   a plurality of mutually parallel ribs extending in a conveying direction and running on an upper side of the segment;
   said ribs having beveled end regions at said at least one end side, said ribs being formed with lateral faces that face neighboring ribs in lateral planes, an upwardly directed cover face in an upper plane, and at least two lateral oblique faces in the end region that are inclined away from one lateral plane in a direction of another lateral plane of the same rib and/or away from said end side in a direction of said rib.

2. The segment according to claim 1, wherein said at least one end side, as viewed in the conveying direction, includes a convexly curved front end side and/or a concavely curved rear end side.

3. The segment according to claim 1, wherein said ribs have a substantially rectangular cross section adjoining said end region.

4. The segment according to claim 1, wherein, in said end region, said ribs have an upper oblique face and, optionally, a front oblique face, at least one of said upper oblique face or said front oblique face is in each case inclined away from said upper plane downward, and away from said end side in a direction of said rib, and wherein said upper oblique face borders said cover face and/or said front oblique face borders said end side.

5. The segment according to claim 1 wherein:
   a virtual sectional plane that is orthogonal to a direction of a longitudinal extent of said rib and through at least two lateral oblique faces intersects each of the lateral oblique faces along a sectional straight, intersects each of said lateral planes along a lateral straight, and intersects said upper plane along an upper straight;
   the upper straight and the sectional straight enclose an upper inclination angle, and the lateral straight and the sectional straight enclose a lower inclination angle; and
   said upper and lower inclination angles are greater than 90° and less than 180°.

6. The segment according to claim 5, wherein said upper and lower inclination angles lie between 115° and 175°.

7. The segment according to claim 5, wherein said upper and lower inclination angles lie between 130° and 160°.

8. The segment according to claim 1, wherein said oblique faces contact one another by way of a corner in at least one common contact point, and/or contact at least one contact edge by way of a corner or edge.

9. The segment according to claim 8, wherein the contact point or the contact edge is spaced apart from said end side and/or from said upper plane.

10. The segment according to claim 8, wherein the contact point or the contact edge is disposed so as to be centric between said lateral planes.

11. The segment according to claim 1, wherein said oblique faces are flat and/or curved.

12. A segment of a conveying installation, the segment comprising:
    at least one end side facing a further, adjoining segment of the conveying installation;
    a plurality of mutually parallel ribs extending in a conveying direction on an upper side of the segment; and
    a strip disposed at said at least one end side of the segment, said strip having:
      an end side facing a strip on an adjoining segment of the conveying installation, and a rear side; and
      a plurality of mutually parallel ribs extending in a conveying direction and running on an upper side of the strip;
      said ribs having beveled end regions at said end side.

13. The strip according to claim 12, wherein said end side is one of a convexly curved end side, or a concavely curved end side.

14. The strip according to claim 12, wherein said ribs are formed with lateral faces that face neighboring ribs in lateral planes, an upwardly directed cover face in an upper plane, and at least two lateral oblique faces in the end region that are inclined away from one lateral plane in a direction of another lateral plane of the same rib and/or away from said end side in a direction of said rib.

15. The strip according to claim 14, wherein, in said end region, said ribs have an upper oblique face and, optionally, a front oblique face, at least one of said upper oblique face or said front oblique face is in each case inclined away from said upper plane downward, and away from said end side in a direction of said rib, and wherein said upper oblique face borders said cover face and/or said front oblique face borders said end side.

16. The strip according to claim 14, wherein:
a virtual sectional plane that is orthogonal to a direction of a longitudinal extent of said rib and through at least two lateral oblique faces intersects each of the lateral oblique faces along a sectional straight, intersects each of said lateral planes along a lateral straight, and intersects said upper plane along an upper straight;
the upper straight and the sectional straight enclose an upper inclination angle, and the lateral straight and the sectional straight enclose a lower inclination angle; and
said upper and lower inclination angles are greater than 90° and less than 180°.

17. The strip according to claim 16, wherein said upper and lower inclination angles lie between 115° and 175°.

18. The strip according to claim 16, wherein said upper and lower inclination angles lie between 130° and 160°.

19. The strip according to claim 14, wherein said oblique faces contact one another by way of a corner in at least one common contact point, and/or contact at least one contact edge by way of a corner or edge.

20. The strip according to claim 19, wherein the contact point or the contact edge is spaced apart from said end side and/or from said upper plane.

21. The strip according to claim 19, wherein the contact point or the contact edge is disposed so as to be centric between said lateral planes.

22. The strip according to claim 14, wherein said oblique faces are flat and/or curved.

23. A conveying installation for transporting people or objects, the conveying installation comprising:
a plurality of segments including a first segment having at least one end side facing a second segment that adjoins said first segment;
a plurality of mutually parallel ribs extending in a conveying direction on an upper side of said segments; and
at least one of said segments being a segment having:
at least one end side facing towards a further segment of the conveying installation; and
a plurality of mutually parallel ribs extending in a conveying direction and running on an upper side of the segment;
said ribs having beveled end regions at said at least one end side.

* * * * *